(12) United States Patent
Freedman et al.

(10) Patent No.: US 9,885,459 B2
(45) Date of Patent: Feb. 6, 2018

(54) PATTERN PROJECTION USING MICRO-LENSES

(71) Applicant: PRIMESENSE LTD, Tel Aviv (IL)

(72) Inventors: Barak Freedman, Binyamina (IL); Alexander Shpunt, Tel Aviv (IL); Meir Machlin, Ashdod (IL); Yoel Arieli, Jerusalem (IL)

(73) Assignee: APPLE INC., Cupertino, CA (US)

( * ) Notice: Subject to any disclaimer, the term of this patent is extended or adjusted under 35 U.S.C. 154(b) by 758 days.

(21) Appl. No.: 13/931,935

(22) Filed: Jun. 30, 2013

(65) Prior Publication Data

US 2013/0294089 A1   Nov. 7, 2013

Related U.S. Application Data

(63) Continuation of application No. 12/522,171, filed as application No. PCT/IL2008/000458 on Apr. 2, 2008, now Pat. No. 8,493,496.

(Continued)

(51) Int. Cl.
| | | |
|---|---|---|
| *G02B 27/09* | (2006.01) | |
| *G02B 3/00* | (2006.01) | |
| *G02B 27/10* | (2006.01) | |
| *G02B 21/06* | (2006.01) | |
| *G02B 21/12* | (2006.01) | |
| *G02B 5/00* | (2006.01) | |
| *F21V 5/04* | (2006.01) | |
| *G01B 11/25* | (2006.01) | |

(Continued)

(52) U.S. Cl.
CPC ............... *F21V 5/04* (2013.01); *G01B 11/25* (2013.01); *G06K 9/2036* (2013.01); *G06T 7/521* (2017.01); *G06K 2209/40* (2013.01); *H04N 13/04* (2013.01)

(58) Field of Classification Search
CPC .......... G01C 3/085; G02B 27/09; G02B 7/32; H04N 13/0271
See application file for complete search history.

(56) References Cited

U.S. PATENT DOCUMENTS 4,542,376 A * 9/1985 Bass ..................... G09G 5/14
345/564
6,078,371 A * 6/2000 Ichikawa .......... G02F 1/133526
349/95

(Continued)

FOREIGN PATENT DOCUMENTS

JP       2000131040 A       5/2000
WO    WO 2007/043036    *   4/2007 ............. G06T 17/00

OTHER PUBLICATIONS

U.S. Appl. No. 12/844,864 Office Action dated Sep. 26, 2013.

(Continued)

*Primary Examiner* — Nicholas Taylor
*Assistant Examiner* — Ho Shiu
(74) *Attorney, Agent, or Firm* — D. Kligler I.P. Services Ltd.

(57) ABSTRACT

An illumination assembly includes a light source, which is configured to emit optical radiation. A transparency containing a plurality of micro-lenses, which are arranged in a non-uniform pattern and are configured to focus the optical radiation to form, at a focal plane, respective focal spots in the non-uniform pattern. Optics are configured to project the non-uniform pattern of the focal spots from the focal plane onto an object.

14 Claims, 5 Drawing Sheets

Related U.S. Application Data

(60) Provisional application No. 61/016,832, filed on Dec. 27, 2007.

(51) Int. Cl.
   *G06K 9/20* (2006.01)
   *G06T 7/521* (2017.01)
   *H04N 13/04* (2006.01)

(56) References Cited

U.S. PATENT DOCUMENTS

| | | | |
|---|---|---|---|
| 6,377,700 | B1 | 4/2002 | Mack et al. |
| 6,441,888 | B1 * | 8/2002 | Azuma ............... G01S 7/481 348/131 |
| 6,633,375 | B1 * | 10/2003 | Veith .................. G01N 21/9501 250/559.41 |
| 7,403,338 | B2 * | 7/2008 | Wu ..................... B82Y 30/00 355/55 |
| 7,811,825 | B2 | 10/2010 | Fauver et al. |
| 2002/0148956 | A1 * | 10/2002 | Piestrup ................. G21K 1/06 250/251 |
| 2004/0063235 | A1 | 4/2004 | Chang |
| 2004/0130790 | A1 * | 7/2004 | Sales ..................... G02B 3/0043 359/619 |
| 2004/0264764 | A1 | 12/2004 | Kochi et al. |
| 2005/0111072 | A1 * | 5/2005 | Miyagaki ............. G02B 5/3016 348/E9.027 |
| 2005/0134582 | A1 | 6/2005 | Claus et al. |
| 2005/0135555 | A1 | 6/2005 | Claus et al. |
| 2006/0018025 | A1 * | 1/2006 | Sharon .................. H04N 9/315 359/618 |
| 2007/0262985 | A1 | 11/2007 | Watanble et al. |
| 2008/0037829 | A1 | 2/2008 | Givon |
| 2008/0106746 | A1 * | 5/2008 | Shpunt ............... G01B 11/2513 356/610 |
| 2008/0285827 | A1 | 11/2008 | Meyer et al. |
| 2009/0046152 | A1 | 2/2009 | Aman |
| 2009/0185157 | A1 * | 7/2009 | Imamura ............... G01C 3/085 356/3.01 |
| 2011/0043403 | A1 | 2/2011 | Loffler |
| 2011/0310125 | A1 | 12/2011 | McEldowney et al. |

OTHER PUBLICATIONS

U.S. Appl. No. 13/921,224 Office Action dated Oct. 3, 2013.
U.S. Appl. No. 12/958,427 Office Action dated Nov. 22, 2013.
Japanese Patent Application # 2011-517308 Office Action dated Jun. 19, 2013.
U.S. Appl. No. 13/036,023 Office Action dated Jul. 17, 2013.
U.S. Appl. No. 12/707,678 Office Action dated Jun. 20, 2013.
International Application PCT/IB2013/051189 Search Report dated Jun. 18, 2013.
U.S. Appl. No. 13/036,023 Office Action dated Sep. 3, 2013.

* cited by examiner

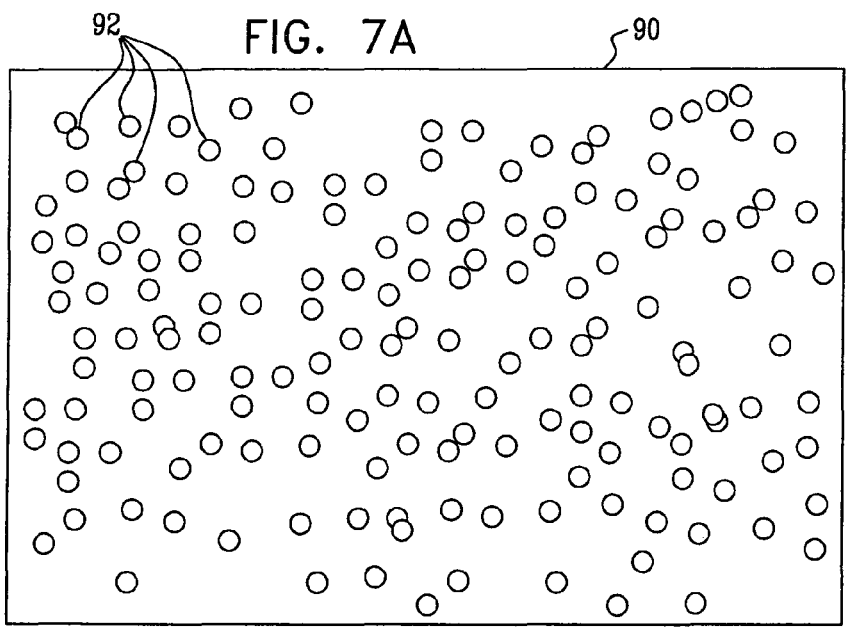
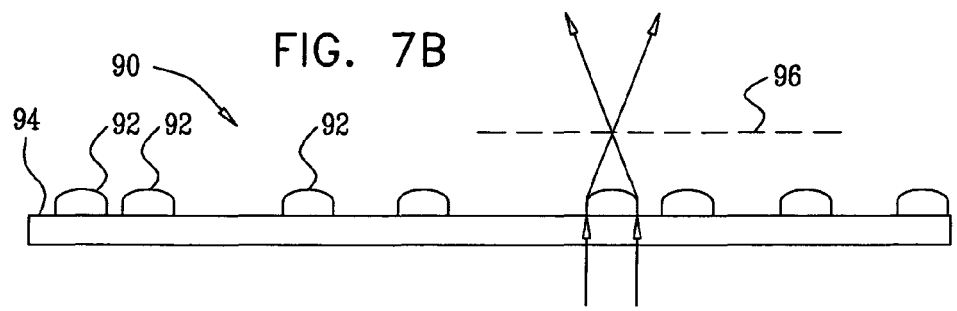
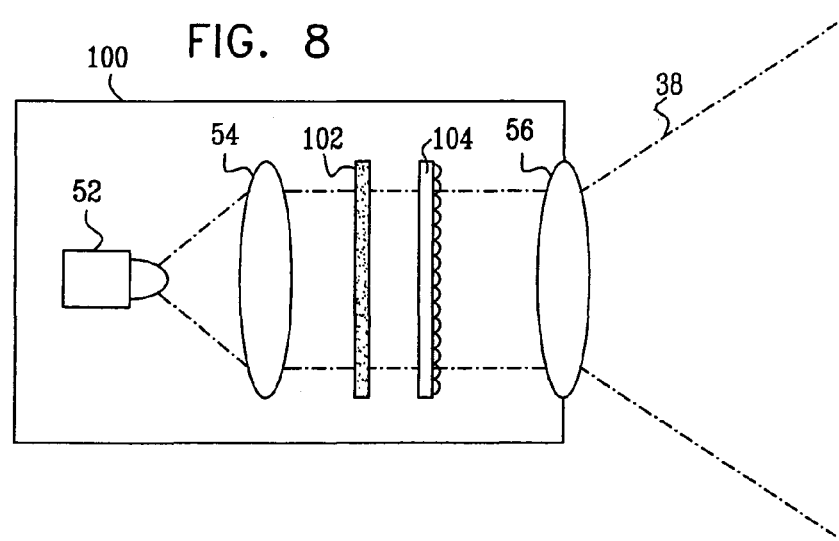

PATTERN PROJECTION USING MICRO-LENSES

CROSS-REFERENCE TO RELATED APPLICATIONS

This application is a continuation of U.S. patent application 12/522,171, filed Dec. 10, 2009, in the national phase of PCT Patent Application PCT/IL2008/000458, filed Apr. 2, 2008, which claims the benefit of U.S. Provisional Patent Application 61/016,832, filed Dec. 27, 2007. All of these related applications are incorporated herein by reference.

FIELD OF THE INVENTION

The present invention relates generally to methods and systems for mapping of three-dimensional (3D) objects, and specifically to optical 3D mapping.

BACKGROUND OF THE INVENTION

Various methods are known in the art for optical 3D mapping, i.e., generating a 3D profile of the surface of an object by processing an optical image of the object.

Some methods are based on projecting a laser speckle pattern onto the object, and then analyzing an image of the pattern on the object. For example, PCT International Publication WO 2007/043036, whose disclosure is incorporated herein by reference, describes a system and method for object reconstruction, in which a coherent light source and a generator of a random speckle pattern projects onto the object a coherent random speckle pattern. An imaging unit detects the light response of the illuminated region and generates image data. Shifts of the pattern in the image of the object relative to a reference image of the pattern are used in real-time reconstruction of a 3D map of the object.

Other methods of optical 3D mapping project different sorts of patterns onto the object to be mapped. For example, PCT International Publication WO 93/03579 describes a three-dimensional vision system in which one or two projectors establish structured light comprising two sets of parallel stripes having different periodicities and angles. As another example, U.S. Pat. No. 6,751,344 describes a method for optically scanning a subject in which the subject is illuminated with a matrix of discrete two-dimensional image objects, such as a grid of dots. Other methods involve projection of a grating pattern, as described, for example, in U.S. Pat. No. 4,802,759. The disclosures of the above-mentioned patents and publications are incorporated herein by reference.

SUMMARY OF THE INVENTION

In embodiments of the present invention, a pattern of spots is projected onto an object, and an image of the pattern on the object is processed in order to reconstruct a 3D map of the object. The pattern on the object is created by projecting optical radiation through a transparency containing the pattern. The embodiments disclosed herein differ in this respect from methods of 3D reconstruction that use laser speckle, in which the pattern is created by optical interference using a diffuser. At the same time, the novel patterns that are used in these embodiments make it possible to perform 3D reconstruction quickly and accurately, using a single, stationary transparency to project the pattern, and a single, stationary image capture assembly to capture images of the object.

There is therefore provided, in accordance with an embodiment of the present invention, apparatus for mapping an object, including:

an illumination assembly, including:
a single transparency containing a fixed pattern of spots; and
a light source, which is configured to transilluminate the single transparency with optical radiation so as to project the pattern onto the object;
an image capture assembly, which is configured to capture an image of the pattern that is projected onto the object using the single transparency; and
a processor, which is coupled to process the image captured by the image capture assembly so as to reconstruct a three-dimensional (3D) map of the object.

In a disclosed embodiment, the pattern is uncorrelated over a range of depths that is mapped by the apparatus.

In some embodiments, the image capture assembly is arranged to capture images of the pattern on the object from a single, fixed location and angle relative to the illumination assembly. Typically, the transparency and light source are fixed in respective positions in the illumination assembly, and the processor is configured to reconstruct the 3D map using the images that are captured only from the single, fixed location and angle with the transparency and light source only in the respective positions.

In one embodiment, the light source includes a point source of the optical radiation. Alternatively, the light source may include a light-emitting diode (LED).

In a disclosed embodiment, the processor is arranged to process a succession of images captured while the object is moving so as to map a 3D movement of the object, wherein the object is a part of a human body, and the 3D movement includes a gesture made by the part of the human body, and wherein the processor is coupled to provide an input to a computer application responsively to the gesture.

There is also provided, in accordance with an embodiment of the present invention, apparatus for mapping an object, including:

an illumination assembly, including:
a transparency containing an uncorrelated pattern of spots; and
a light source, which is configured to transilluminate the transparency with optical radiation so as to project the uncorrelated pattern onto the object;
an image capture assembly, which is configured to capture an image of the uncorrelated pattern that is projected onto the object; and
a processor, which is coupled to process the image captured by the image capture assembly so as to reconstruct a three-dimensional (3D) map of the object.

In one embodiment, the uncorrelated pattern includes a pseudo-random pattern. In another embodiment, the uncorrelated pattern includes a quasi-periodic pattern, wherein the quasi-periodic pattern has an n-fold symmetry, with n=5 or n≥7.

Typically, the uncorrelated pattern has a duty cycle that is less than 1/e. Alternatively or additionally, the spots have a local duty cycle that varies across the pattern.

In an alternative embodiment, the transparency contains a plurality of parallel bands, repeating periodically in a first direction, each band containing a replica of the uncorrelated pattern extending across at least a part of the transparency in a second direction, perpendicular to the first direction.

In some embodiments, the processor is configured to derive the 3D map by finding respective offsets between the pattern of the spots on multiple areas of the object captured in the image of the pattern that is projected onto the object and a reference image of the pattern, wherein the respective offsets are indicative of respective distances between the areas and the image capture assembly. In one embodiment, the spots have a local duty cycle that varies monotonically along an axis across the pattern, and the processor is configured to determine local gray levels of the multiple areas in the image responsively to the local duty cycle, and to estimate the respective offsets based on the local gray levels.

In an alternative embodiment, the spots in the transparency comprise micro-lenses arranged in the fixed or uncorrelated pattern.

There is furthermore provided, in accordance with an embodiment of the present invention, apparatus for mapping an object, including:

an illumination assembly, including:
  a transparency containing a plurality of micro-lenses arranged in a non-uniform pattern; and
  a light source, which is configured to transilluminate the transparency with optical radiation so as to project the pattern onto the object;
an image capture assembly, which is configured to capture an image of the pattern that is projected onto the object using the transparency; and
a processor, which is coupled to process the image captured by the image capture assembly so as to reconstruct a three-dimensional (3D) map of the object.

Typically, the micro-lenses are configured to focus the optical radiation to form respective focal spots at a focal plane in the non-uniform pattern, and the light source includes optics for projecting the non-uniform pattern of the focal spots from the focal plane onto the object. Alternatively, at least some of the micro-lenses have differing focal lengths, and the light source includes optics for projecting the non-uniform pattern of the focal spots so that the pattern that is projected on the object varies with distance from the illumination assembly.

There is additionally provided, in accordance with an embodiment of the present invention, a method for mapping an object, including:

transilluminating a single transparency containing a fixed pattern of spots so as to project the pattern onto the object;
capturing an image of the pattern that is projected onto the object using the single transparency; and
processing the captured image so as to reconstruct a three-dimensional (3D) map of the object.

There is further provided, in accordance with an embodiment of the present invention, a method for mapping an object, including:

an illumination assembly, including:
transilluminating a transparency, containing an uncorrelated pattern of spots so as to project the uncorrelated pattern onto the object;
capturing an image of the uncorrelated pattern that is projected onto the object; and
processing the captured image so as to reconstruct a three-dimensional (3D) map of the object.

There is moreover provided, in accordance with an embodiment of the present invention, a method for mapping an object, including:

transilluminating a transparency containing a plurality of micro-lenses arranged in a non-uniform pattern so as to project the non-uniform pattern onto the object;
capturing an image of the non-uniform pattern that is projected onto the object; and
processing the captured image so as to reconstruct a three-dimensional (3D) map of the object.

The present invention will be more fully understood from the following detailed description of the embodiments thereof, taken together with the drawings in which:

BRIEF DESCRIPTION OF THE DRAWINGS

FIG. 7A is a schematic frontal view of a transparency for use in 3D mapping, in accordance with an embodiment of the present invention;

FIG. 7B is a schematic side view of the transparency of FIG. 7A, showing passage of optical rays through the transparency, in accordance with an embodiment of the present invention; and FIG. 8 is a schematic top view of an illumination assembly for use in 3D mapping, in accordance with another embodiment of the present invention.

DETAILED DESCRIPTION OF EMBODIMENTS

Figure 1:
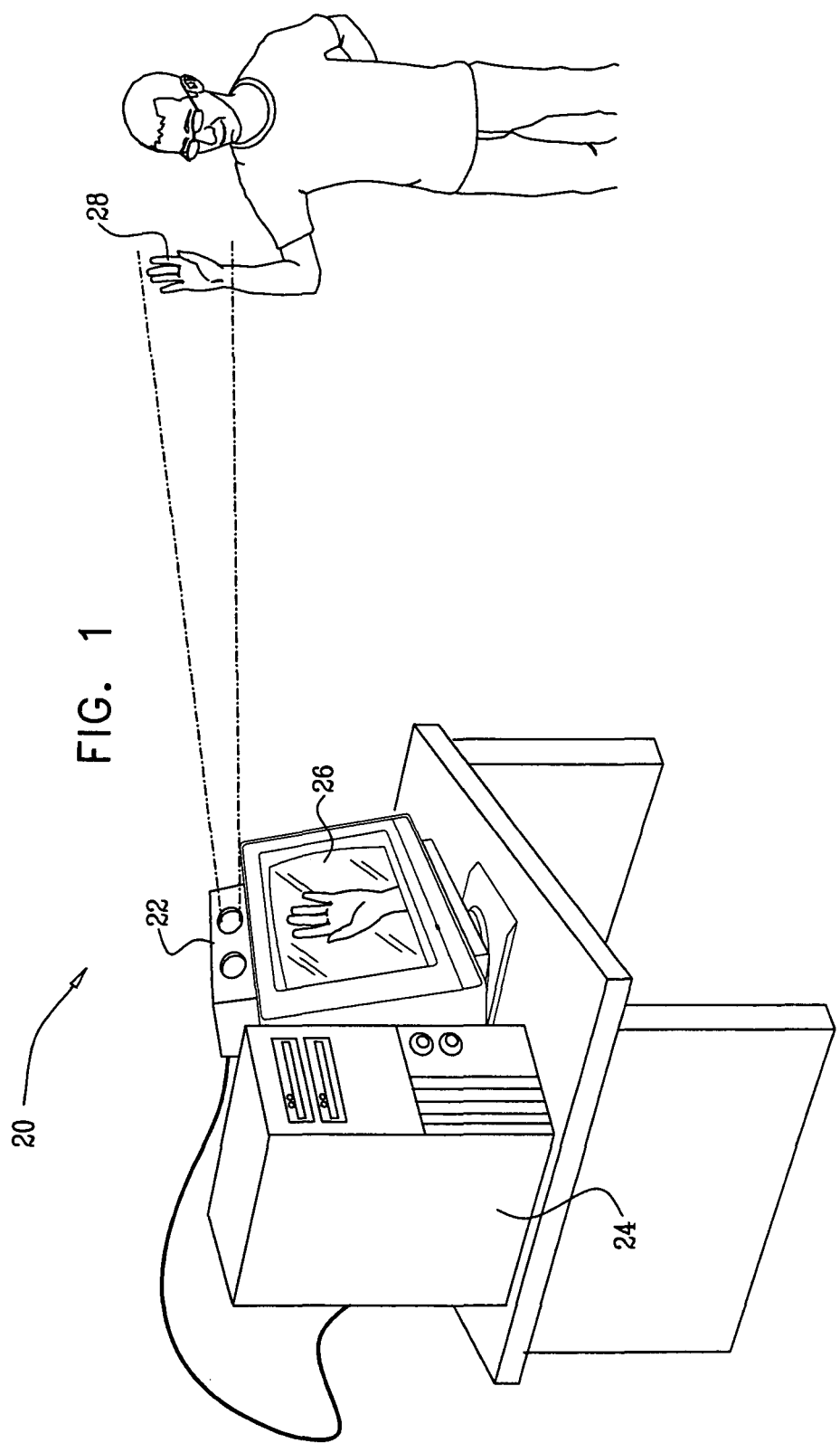
FIG. 1 is a schematic, pictorial illustration of a system for 3D mapping, in accordance with an embodiment of the present invention.

FIG. 1 is a schematic, pictorial illustration of a system 20 for 3D optical mapping, in accordance with an embodiment of the present invention. System 20 comprises an imaging device 22, which generates and projects a pattern onto an object 28 and captures an image of the pattern appearing on the object. Details of the design and operation of device 22 are shown in the figures that follow and are described hereinbelow with reference thereto.

In some embodiments, device 22 projects an uncorrelated pattern of spots onto object 28. In the context of the present patent application and in the claims, the term "uncorrelated pattern" refers to a projected pattern of spots (which may be bright or dark), whose positions are uncorrelated in planes transverse to the projection beam axis. The positions are uncorrelated in the sense that the auto-correlation of the pattern as a function of transverse shift is insignificant for any shift larger than the spot size and no greater than the maximum shift that may occur over the range of depths mapped by the system. Random patterns, such as a laser speckle pattern, are uncorrelated in this sense. Synthetic patterns, created by human or computer design, such as pseudo-random and quasi-periodic patterns, may also be uncorrelated to the extent specified by the above definition.

An image processor 24 processes image data generated by device 22 in order to reconstruct a 3D map of object 28. The term "3D map" refers to a set of 3D coordinates representing the surface of the object. The derivation of such a map based on image data is referred to herein as "3D mapping" or equivalently, "3D reconstruction." Image processor 24 computes the 3D coordinates of points on the surface of object 28 by triangulation, based on the transverse shifts of the spots in an image of the pattern that is projected onto the object relative to a reference pattern at a known distance from device 22. Methods for this sort of triangulation-based 3D mapping using a projected laser speckle pattern are described in the above-mentioned PCT publication WO 2007/043036 and in PCT Patent Application PCT/IL2007/000306, filed Mar. 8, 2007, and published as WO 2007/105205, which is assigned to the assignee of the present patent application, and whose disclosure is incorporated herein by reference. These methods may be implemented, mutatis mutandis, using synthetic uncorrelated patterns in system 20.

Image processor 24 may comprise a general-purpose computer processor, which is programmed in software to carry out the functions described hereinbelow. The software may be downloaded to processor 24 in electronic form, over a network, for example, or it may alternatively be provided on tangible media, such as optical, magnetic, or electronic memory media. Alternatively or additionally, some or all of the functions of the image processor may be implemented in dedicated hardware, such as a custom or semi-custom integrated circuit or a programmable digital signal processor (DSP). Although processor 24 is shown in FIG. 1, by way of example, as a separate unit from imaging device 22, some or all of the processing functions of processor 24 may be performed by suitable dedicated circuitry within the housing of the imaging device or otherwise associated with the imaging device.

The 3D map that is generated by processor 24 may be used for a wide range of different purposes. For example, the map may be sent to an output device, such as a display 26, which shows a pseudo-3D image of the object. In the example shown in FIG. 1, object 28 comprises all or a part (such as a hand) of the body of a subject. In this case, system 20 may be used to provide a gesture-based user interface, in which user movements detected by means of device 22 control an interactive computer application, such as a game, in place of tactile interface elements such as a mouse, joystick or other accessory. Alternatively, system 20 may be used to create 3D maps of objects of other types, for substantially any application in which 3D coordinate profiles are needed.

Figure 2:
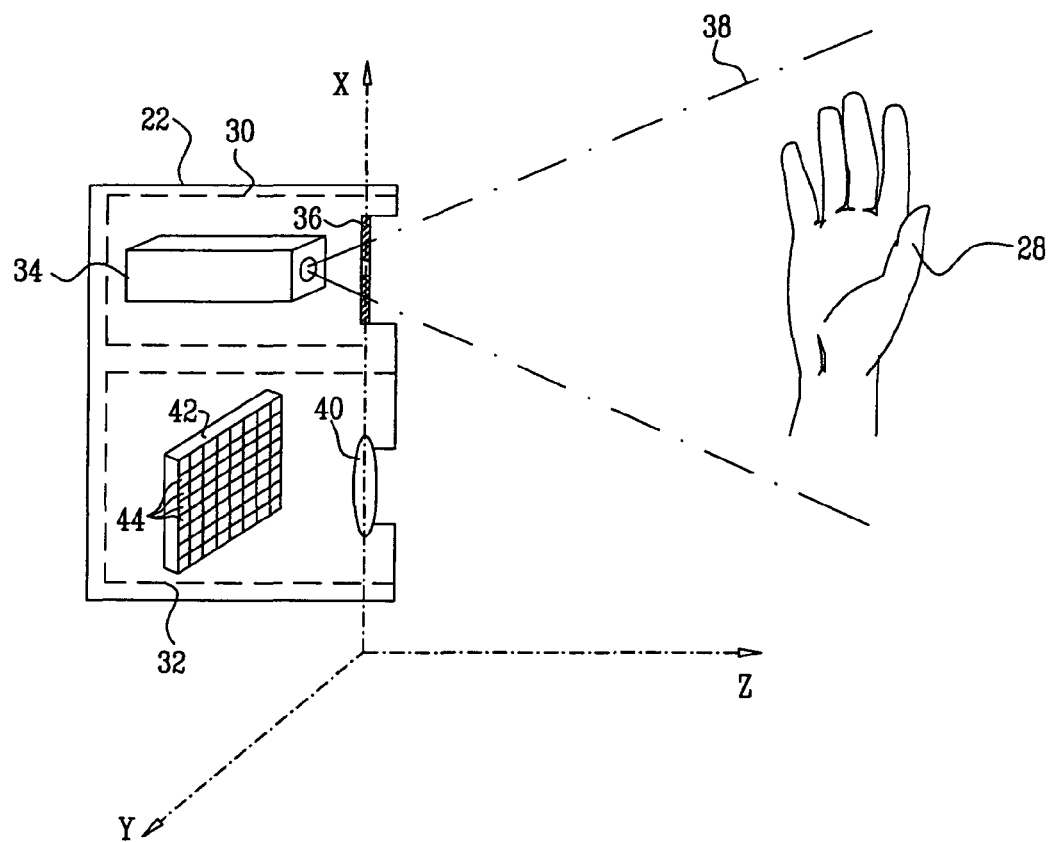
FIG. 2 is a schematic top view of an imaging device for use in 3D mapping, in accordance with an embodiment of the present invention.

FIG. 2 is a schematic top view of device 22, in accordance with an embodiment of the present invention. An illumination assembly 30 in device 22 comprises a light source 34 (which may be a point source, such as a laser, without additional optics, as explained below) and a transparency 36, which are used in combination to project a pattern of spots onto object 28. In the context of the present patent application and in the claims, the term "transparency" is used in its ordinary sense to mean a positive image on a transparent support. Slides and foils are examples of such transparencies. In some embodiments of the present invention, the positive image on transparency 36 is an image of the pattern that is to be projected onto object 28. A single, stationary transparency, fixed in the housing of assembly 30, with a fixed, uncorrelated pattern of spots, is sufficient for the purposes of these embodiments. Alternatively, the illumination assembly may be configured to provide variable patterns, by alternating among different fixed transparencies, or using a variable transparency, such as a programmable spatial light modulator.

Transparency 36 may contain various sorts of fixed, uncorrelated patterns of spots. For example, the transparency may contain a pattern of binary (white/black) spots, distributed over the area of the transparency according to the values of a pseudo-random distribution function. Other examples of uncorrelated spot patterns are described hereinbelow with reference to FIGS. 4 and 5. For good performance in the mapping process, it is advantageous that the spot pattern have a low duty cycle, i.e., that the fraction of the area of the pattern with above-average brightness be no greater than $1/e$, and desirably less than $\frac{1}{4}$ or even $\frac{1}{10}$. The low duty cycle is beneficial in enhancing the signal/noise ratio of spot shift detection for 3D mapping.

Figure 3:
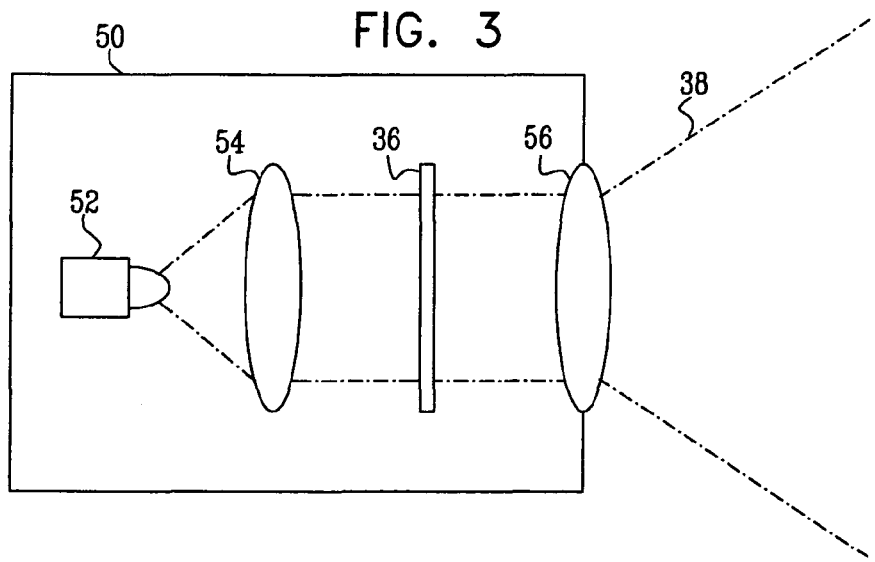
FIG. 3 is a schematic top view of an illumination assembly for use in 3D mapping, in accordance with an embodiment of the present invention.

Light source 34 transilluminates transparency 36 with optical radiation so as to project an image of the spot pattern that is contained by the transparency onto object 28. (The terms "light" and "optical radiation" in the context of the present patent application refer to any band of optical radiation, including infrared and ultraviolet, as well as visible light. In some applications, however, near-infrared light is preferred on account of the availability of suitable, low-cost sources and detectors and the fact that the spot pattern is thus invisible to human viewers.) In the configuration shown in FIG. 2, light source 34 is a point source, meaning that the rays of radiation emitted by the light source emanate from a locus small enough so that the spot pattern on transparency 36 is replicated sharply on object 28. For this purpose, light source 34 may comprise, for example, a coherent source with large angular divergence, such as a laser diode. When a point source is used with the transparency in this manner, no other projection optics are required. Alternatively, the illumination assembly may comprise suitable projection optics, as shown in FIG. 3, for example. In either case, the light source is typically mounted in the housing of assembly 30 in a fixed position relative to transparency 36.

An image capture assembly 32 captures an image of the pattern that is projected by illumination assembly 30 onto object 28. Assembly 32 comprises objective optics 40, which focus the image onto an image sensor 42. Typically, sensor 42 comprises a rectilinear array of detector elements 44, such as a CCD or CMOS-based image sensor array. Assembly 32 may also comprise a bandpass filter (not shown in the figures), chosen and positioned so that sensor 42 receives only light in the emission band of light source 34, while filtering out ambient light that might otherwise reduce the contrast of the image of the projected pattern that is captured by the sensor.

In the embodiment shown in FIG. 2, illumination assembly 30 and image capture assembly 32 are held in a fixed spatial relation. This configuration and the processing techniques used by image processor 24 make it possible to perform 3D mapping using the single image capture assembly, without relative movement between the illumination and image capture assemblies and without moving parts. Alternatively, the techniques of illumination and mapping that are described hereinbelow may be used in conjunction with other sorts of image capture assemblies, in various different configurations, such as those described in the Background section above. For example, the image capture assembly may be movable relative to the illumination assembly. Additionally or alternatively, two or more image capture assemblies may be used to capture images of object 28 from different angles.

To simplify the computation of the 3D map and of changes in the map due to motion of object 28 in the configuration of FIG. 2, assemblies 30 and 32 may be mounted so that an axis passing through the centers of the entrance pupil of image capture assembly 32 and the spot formed by light source 34 on transparency 36 is parallel to one of the axes of sensor 40 (taken for convenience to be the X-axis, while the Z-axis corresponds to distance from device 22). The advantages of this arrangement are explained further in the above-mentioned PCT patent application PCT/IL2007/000306.

Specifically, by triangulation in this arrangement, a Z-direction shift of a point on the object, δZ, will engender a concomitant transverse shift δX in the spot pattern observed in the image. Z-coordinates of points on the object, as well as shifts in the Z-coordinates over time, may thus be determined by measuring shifts in the X-coordinates of the spots in the image captured by assembly 32 relative to a reference image taken at a known distance Z. Y-direction shifts may be disregarded. This sort of triangulation approach is appropriate particularly in 3D mapping using uncorrelated patterns of spots, although aspects of the approach may be adapted for use with other types of patterns, as well.

Thus, to generate the 3D map of object 28, image processor 24 (FIG. 1) compares the group of spots in each area of the captured image to the reference image in order to find the most closely-matching group of spots in the reference image. The relative shift between the matching groups of spots in the image gives the Z-direction shift of the area of the captured image relative to the reference image. The shift in the spot pattern may be measured using image correlation or other image matching computation methods that are known in the art. Some exemplary methods are described in the above-mentioned PCT patent application and PCT International Publication WO 2007/043036.

FIG. 3 is a schematic top view of an illumination assembly 50, which may be used in device 22 in place of assembly 30, in accordance with an alternative embodiment of the present invention. In this embodiment, transparency 36 is transilluminated using a non-point light source, such as a light-emitting diode (LED) 52 with suitable optics 54 and 56. The configuration and locations of optics 54 and 56 in FIG. 3 are arbitrary, and any suitable sort of projection optics may be used to project the image of the pattern from transparency 36 onto object 28 using light from LED 52. As in assembly 30 (FIG. 2), the elements of illumination assembly 50 may be fixed within the housing of the assembly. The use of LED 52 in assembly 50 is advantageous in terms of reducing the size, cost and heat dissipation of the assembly, as well as improving the mean time between failures (MTBF) and overall reliability of the assembly. Furthermore, because the LED emits light in a relatively narrow band of wavelengths, the light collected by objective optics 40 (FIG. 2) can be effectively filtered by a suitable bandpass filter in image capture assembly 32, as explained above.

Figure 4:
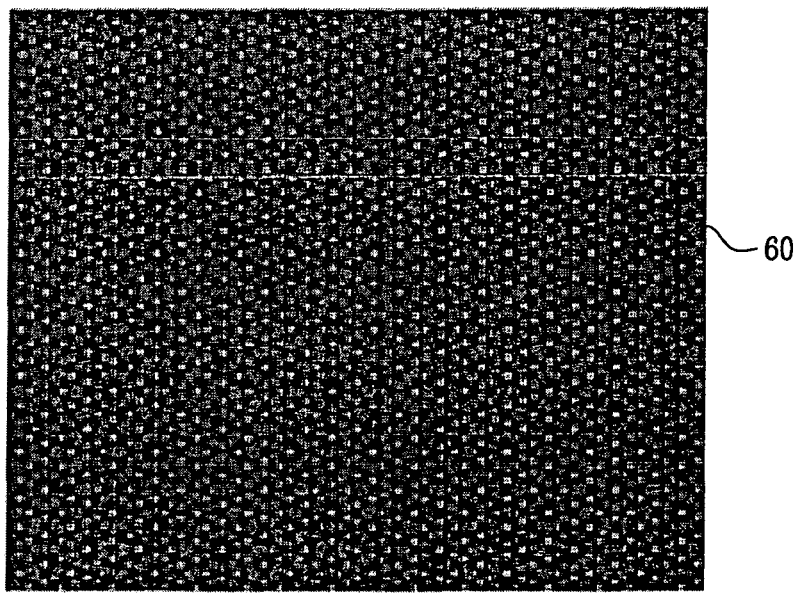
FIGS. 4-6 are schematic representations of patterns for use in 3D mapping, in accordance with embodiments of the present invention.

FIG. 4 is a schematic representation of a pattern 60 that may be contained in transparency 36, in accordance with an embodiment of the present invention. Pattern 60 is quasi-periodic with an underlying five-fold symmetry. Quasi-periodic patterns are characterized by distinct peaks in the frequency domain (reciprocal space), but contain no unit cell that repeats over the area of the pattern in the spatial domain (real space). For example, pattern 60 belongs to the family of patterns with n-fold symmetry having local intensity AO described by the following equation:

$$I = \left| \sum_{m=0}^{n-1} e^{ik_m \cdot r} \right|^2$$

wherein $$k_m = \left( \cos\frac{2\pi m}{\text{fold}}, \sin\frac{2\pi m}{\text{fold}} \right).$$

For n=5 or n≥7 (n=5, 7, 8, . . . ), these patterns are uncorrelated in the sense defined above. Alternatively, transparency 36 may contain uncorrelated quasi-periodic patterns of other types.

The use of quasi-periodic patterns in system 20 is advantageous in that the pattern has a known spatial frequency spectrum, with distinct peaks (as opposed to random and pseudo-random patterns, whose spectrum is flat). Processor 24 may use this spectral information in filtering digital images of the pattern that are captured by image capture assembly 32, and may thus reduce the effects of noise and ambient light in the image correlation computation. On the other hand, because the pattern is uncorrelated over the range of depths mapped by the system, the likelihood of erroneous mapping results is reduced, since only a correct match between an area of the image of the object and a corresponding area of the reference image will give a high correlation value.

Figure 5:
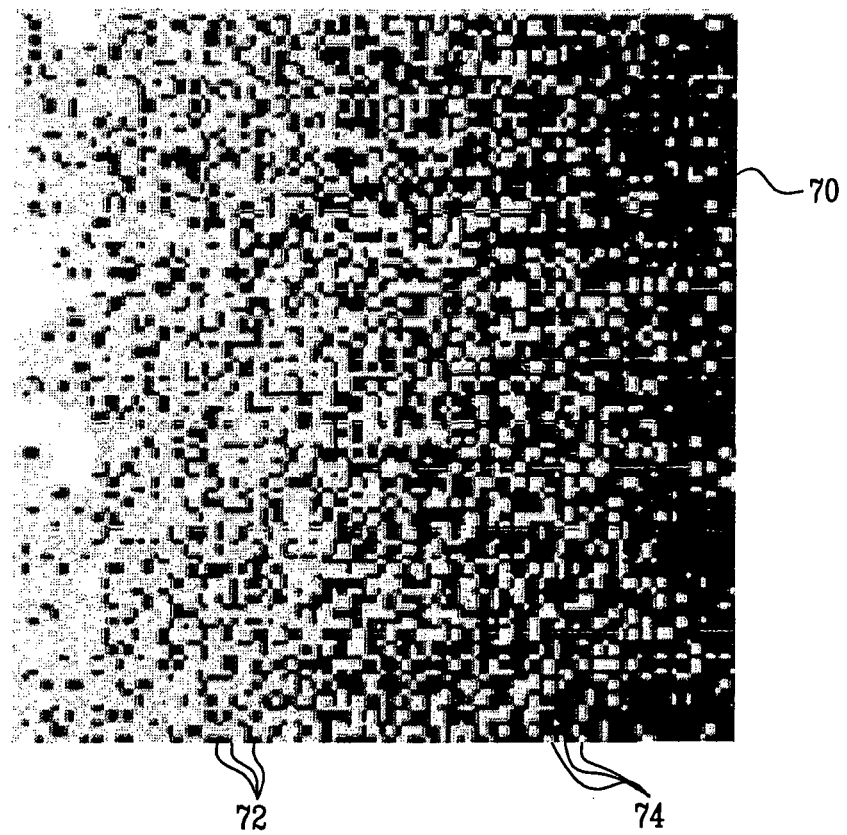

FIG. 5 is a schematic representation of a pattern 70 that may be contained in transparency 36, in accordance with another embodiment of the present invention. Pattern 70 comprises a pseudo-random distribution of black pixels 72 interspersed with white pixels 74, with a local duty cycle of white pixels that decreases monotonically along the horizontal (X) axis. In other words, in any local region, the distribution of black and white pixels is random. Taken over a larger area, however (for example, a block of 10×10 pixels), the number of white pixels relative to the number of black pixels decreases from left to right across the pattern. Taking the sum of pixel values over such a block to be its gray level, the gray level similarly decreases monotonically across the pattern.

When slide 36 contains pattern 70, the gray level of the pattern projected onto object 28, when observed at low resolution, will likewise vary across the image of the object. Therefore, in an initial processing phase, processor 24 may process the image at low resolution in order to determine the gray level of each area in the image of the object. The processor may then compare this gray level to the distribution of gray levels across the reference image in order to make a rough estimate of the depth (Z-coordinate) of each area of the object. For some applications, this rough estimate may be sufficient.

Alternatively, the processor may use this initial estimate in choosing, for each area of the image of the object, the appropriate area of the reference image in which to search for a matching part of the spot pattern. By matching the spot pattern, the processor computes more accurate depth values. This two-step processing approach can be advantageous in avoiding erroneous mapping results and possibly in reducing the overall computation time. Although FIG. 5 shows a pseudo-random pattern, the variation of spot density across the transparency may similarly be applied to patterns of other sorts.

Figure 6:
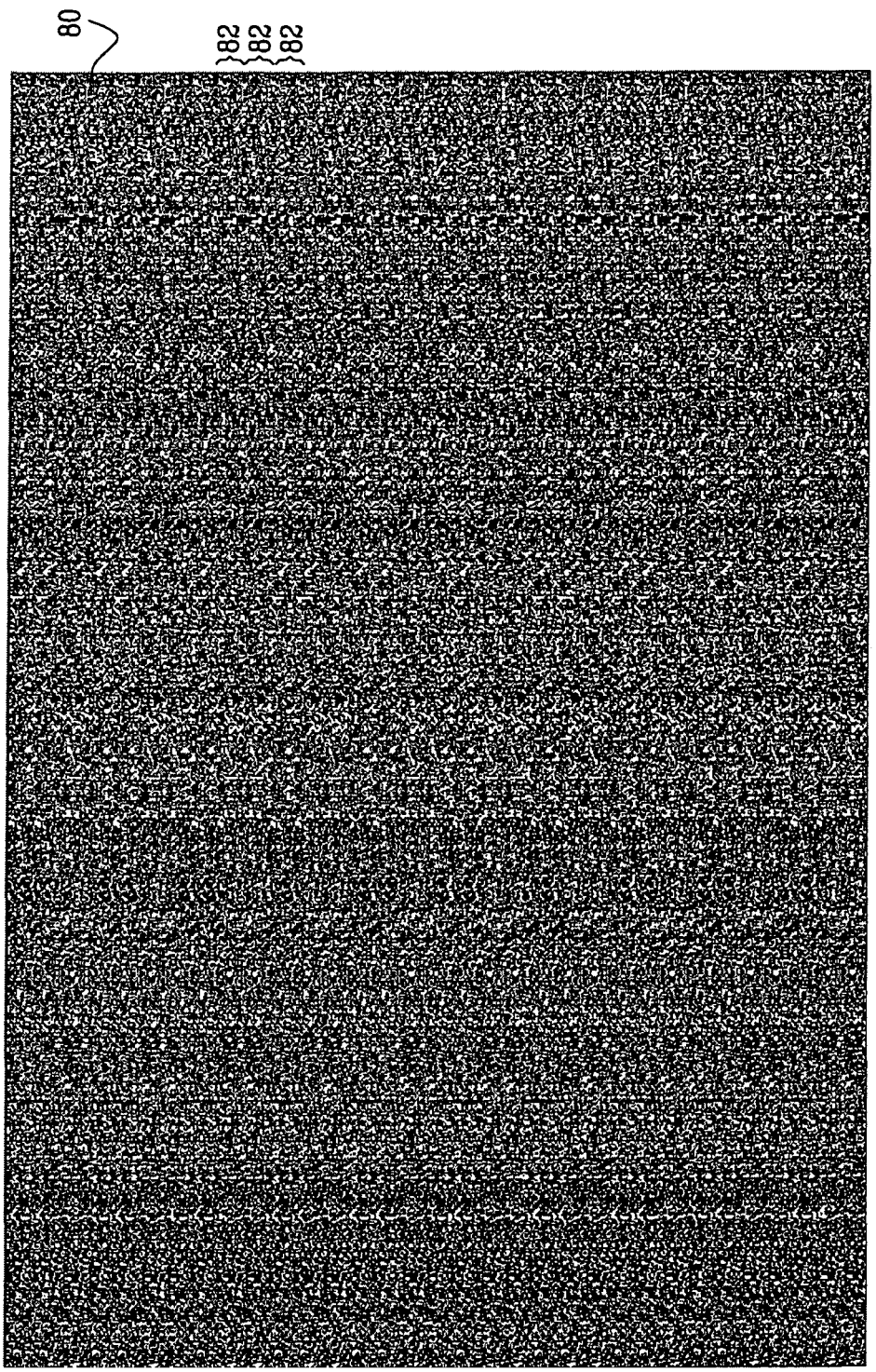

FIG. 6 is a schematic representation of a pattern 80 that may be contained in transparency 36, in accordance with yet another embodiment of the present invention. Pattern 80 comprises multiple parallel bands 82, repeating periodically, each band comprising a replica of the same pseudo-random distribution of spots. In accordance with the arrangement of axes in FIG. 2, the bands are assumed to extend across the transparency (or across at least a part of the transparency) in the X-direction, which is horizontal in FIG. 6. As noted above, when device 22 is configured in the manner shown in FIG. 2, with the entrance pupil of image capture assembly 32 and the spot formed by light source 34 on transparency 36 aligned parallel to the X-axis, only X-direction shifts of the pattern projected on the object need be measured in order to map the Z-coordinates of the object. Y-direction shifts may be disregarded. Therefore, it is sufficient that the pattern be uncorrelated in the X-direction, while Y-direction correlation is unimportant (for distances greater than the size of the correlation window).

Because bands 82 in pattern 80 repeat periodically in the Y-direction, processor 24 may use the image of a single band 82 as a reference image in determining the X-direction shift of an area in the image of the object, regardless of the Y-coordinates of the area. Therefore the memory required to store the reference image is reduced. The complexity of the computation may be reduced, as well, since the range of the search for a matching area in the reference image is limited. Bands 82 may alternatively comprise other types of patterns that are uncorrelated in the X-direction, such as types of patterns shown above in FIGS. 4 and 5.

Reference is now made to FIGS. 7A and 7B, which schematically illustrate a transparency 90, which may be used in illumination assembly 50 in place of transparency 36 (FIG. 3), in accordance with an embodiment of the present invention. FIG. 7A is a frontal view of the transparency, while FIG. 7B is a side view.

In this embodiment, the spots on transparency 90 comprise micro-lenses 92, which are distributed over a transparent substrate 94 in a non-uniform, uncorrelated pattern, such as a random or pseudo-random pattern. The duty cycle of the pattern is given by the density of the micro-lenses per unit area and the optical properties of the, micro-lenses and other projection optics (which define the focal spot size). The duty cycle is typically (although not necessarily) less than 1/e, as explained above. Micro-lenses 92 may be formed on substrate 94 using a photolithographic process, for example, as is used to produce uniform micro-lens grid arrays that are known in the art. Such processes are capable of fabricating micro-lenses with diameter on the order of 0.1 mm and focal lengths of 5-6 mm. Alternatively, micro-lenses 92 may have larger or smaller dimensions and focal lengths, depending on the process and application requirements.

As shown in FIG. 7B, micro-lenses 92 focus light from a light source, such as LED 52, onto a focal plane 96. Each micro-lens thus forms a corresponding bright focal spot at the focal plane. Optic 56 projects this pattern of bright spots onto object 28. For clarity of illustration, micro-lenses 92 are shown in FIGS. 7A and 7B as being sparsely distributed over the area of substrate 94, but in practice the micro-lenses may be more densely packed. This arrangement is advantageous, by comparison with the other embodiments described above, in that substantially all of the light from the light source is projected onto the object: Transparency 90 effectively redistributes the light, rather blocking a part of the light in the dark areas of the pattern.

As a further alternative, the micro-lenses may have non-uniform focal lengths. For example, different micro-lenses may have different focal lengths, so that the pattern that is projected on the object varies with distance from the illumination assembly. As another example, some or all of the micro-lenses may have multiple different focal lengths. Alternatively or additionally, the micro-lenses or the projection optics (such as optic 56 in FIG. 3) may be astigmatic, meaning that they have different focal lengths in different planes, so that the shapes of the spots will vary with distance. (As yet another alternative, an equivalent result may be obtained by making objective optics 40 (FIG. 2) astigmatic.) These sorts of depth-varying pattern may be used in range mapping, as described, for example, in PCT International Publications WO 2007/996893 and WO 2007/105215, whose disclosures are incorporated herein by reference.

FIG. 8 is a schematic top view of an illumination assembly 100, which may be used in place of assembly 30 (FIG. 2) or assembly 50 (FIG. 3) in 3D mapping, in accordance with another embodiment of the present invention. In this case, light from LED 52 or from another source is directed by optic 54 through a diffuser 102 followed by a uniform micro-lens array 104. In this configuration, the wavefront variations introduced by the diffuser will give rise to randomization of the locations of the spots formed by the micro-lenses. Optic 56 projects this pattern of spots onto the object that is to be mapped. In this case, too, astigmatic optics or other means may be used to make the pattern vary with distance from the illumination assembly.

The patterns in FIGS. 4-6 and 7A/B are shown solely by way of example, and transparencies containing other sorts of uncorrelated patterns may similarly be used in system 20 and are considered to be within the scope of the present invention. Furthermore, although the embodiments described above relate to the specific configuration of system 20 and design of device 22 that are described above, certain principles of the present invention may similarly be applied in systems and devices of other types for optical 3D mapping. For example, aspects of the embodiments described above may be applied in systems in that use multiple image capture assemblies, or in which the image capture assembly and the illumination assembly are movable relative to one another.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An illumination assembly, comprising:
   a light source, which is configured to emit optical radiation;
   a transparency containing a plurality of micro-lenses, which are arranged in a non-uniform pattern and are configured to focus the optical radiation to form, at a focal plane, respective bright focal spots interspersed with dark areas in the non-uniform pattern, such that each of the micro-lenses forms a corresponding one of the bright focal spots at the focal plane; and
   optics configured to project the non-uniform pattern of the bright focal spots interspersed with dark areas from the focal plane onto an object, wherein the projected pattern has a duty cycle, given by a density of the micro-lenses per unit area, that is less than 1/e.

2. The assembly according to claim 1, wherein the non-uniform pattern in which the micro-lenses are arranged is an uncorrelated pattern.

3. The assembly according to claim 2, wherein the uncorrelated pattern is a random or pseudo-random pattern.

4. The assembly according to claim 1, wherein at least some of the micro-lenses have non-uniform focal lengths.

5. The assembly according to claim 4, wherein the at least some of the micro-lenses have different focal lengths, and wherein the optics are configured to project the non-uniform pattern of the focal spots so that the pattern that is projected on the object varies with distance from the illumination assembly.

6. A method for illumination, comprising:

transilluminating a transparency containing a plurality of micro-lenses arranged in a non-uniform pattern, wherein the micro-lenses are configured to focus the optical radiation so as to form, at a focal plane, respective bright focal spots interspersed with dark areas in the non-uniform pattern, such that each of the micro-lenses forms a corresponding one of the bright focal spots at the focal plane; and projecting the non-uniform pattern of the bright focal spots interspersed with dark areas from the focal plane onto an object, wherein the projected pattern has a duty cycle, given by a density of the micro-lenses per unit area, that is less than $1/e$.

7. The method according to claim 6, wherein the non-uniform pattern in which the micro-lenses are arranged is an uncorrelated pattern.

8. The method according to claim 7, wherein the uncorrelated pattern is a random or pseudo-random pattern.

9. The method according to claim 6, wherein at least some of the micro-lenses have non-uniform focal lengths.

10. The method according to claim 9, wherein the at least some of the micro-lenses have different focal lengths, and wherein projecting the non-uniform pattern comprises projecting the focal spots so that the pattern that is projected on the object varies with distance from the transparency.

11. An illumination assembly, comprising:

a diffuser;

a light source, which is configured to transilluminate the diffuser with optical radiation;

a transparency containing an array of micro-lenses, which are arranged to focus the optical radiation transmitted through the diffuser, thereby generating a pattern of bright spots interspersed with dark areas, such that each of the micro-lenses forms a corresponding one of the bright focal spots at a focal plane; and projection optics, which are arranged to project the pattern of bright spots interspersed with dark areas onto an object, wherein the projected pattern has a duty cycle, given by a density of the micro-lenses per unit area, that is less than $1/e$.

12. The assembly according to claim 11, wherein the projection optics are configured to project the pattern so that the pattern varies with distance from the illumination assembly.

13. A method for illumination, comprising:

transilluminating a diffuser with optical radiation;

focusing the optical radiation transmitted through the diffuser using an array of micro-lenses, thereby generating a pattern of bright spots interspersed with dark areas, such that each of the micro-lenses forms a corresponding one of the bright focal spots at a focal plane; and projecting the pattern of bright spots interspersed with dark areas onto an object, wherein the projected pattern has a duty cycle, (liven by a density of the micro-lenses per unit area, that is less than $1/e$.

14. The method according to claim 13, wherein the projected pattern varies with distance from the array of micro-lenses.

* * * * *